(12) United States Patent
Tahara

(10) Patent No.: US 11,374,788 B2
(45) Date of Patent: Jun. 28, 2022

(54) NETWORK SYSTEM HAVING MASTER DEVICE CARRYING OUT PART OF A PROCESS AND SLAVE DEVICE CARRYING OUT REMAINDER OF THE PROCESS

(71) Applicant: OMRON Corporation, Kyoto (JP)

(72) Inventor: Yutaka Tahara, Ritto (JP)

(73) Assignee: OMRON CORPORATION, Kyoto (JP)

( * ) Notice: Subject to any disclaimer, the term of this patent is extended or adjusted under 35 U.S.C. 154(b) by 271 days.

(21) Appl. No.: 16/644,973

(22) PCT Filed: Mar. 8, 2019

(86) PCT No.: PCT/JP2019/009240
§ 371 (c)(1),
(2) Date: Mar. 6, 2020

(87) PCT Pub. No.: WO2019/176755
PCT Pub. Date: Sep. 19, 2019

(65) Prior Publication Data
US 2021/0377072 A1    Dec. 2, 2021

(30) Foreign Application Priority Data

Mar. 15, 2018 (JP) .............................. JP2018-047601

(51) Int. Cl.
*H04L 12/40* (2006.01)
*G05B 19/05* (2006.01)
*G06F 9/50* (2006.01)

(52) U.S. Cl.
CPC .. *H04L 12/4015* (2013.01); *H04L 2012/4026* (2013.01)

(58) Field of Classification Search
CPC ............... H04L 12/40; H04L 12/40143; H04L 12/4015; H04L 12/4026
See application file for complete search history.

(56) References Cited

U.S. PATENT DOCUMENTS

2006/0101465 A1    5/2006  Kato et al.
2007/0112990 A1*   5/2007  Hayashita ........... G06F 13/4291
                                                710/305
(Continued)

FOREIGN PATENT DOCUMENTS

CN     101741885 A    6/2010
CN     102387136 A    3/2012
(Continued)

OTHER PUBLICATIONS

English translation of the International Search Report("ISR") of PCT/JP2019/009240 dated Jun. 4, 2019.
(Continued)

*Primary Examiner* — Jenee Holland
(74) *Attorney, Agent, or Firm* — Metrolex IP Law Group, PLLC

(57) ABSTRACT

A network system includes: a first master device configured to carry out, in every cycle, (i) a process of receiving data from a first slave device, (ii) a process of carrying out, in accordance with pre-allocation, a part of a first process with respect to the data, (iii) a process of transmitting data corresponding to a remainder of the first process to an outside entity in accordance with the pre-allocation and receiving a result corresponding the remainder of the first process, and (iv) a process of transmitting, to the first slave device, a result corresponding to the first process; and at least one second master device configured to transmit, to the first master device before a period allocated to the first process within the cycle ends, the result corresponding to the remainder of the first process with respect to the data received from the first master device.

11 Claims, 13 Drawing Sheets

(56) References Cited

U.S. PATENT DOCUMENTS

| | | | | |
|---|---|---|---|---|
| 2007/0186026 | A1* | 8/2007 | Kwon | G06F 13/1605 710/309 |
| 2010/0332705 | A1* | 12/2010 | Beyer | H04L 12/403 710/110 |
| 2011/0245934 | A1 | 10/2011 | Yasuda | |
| 2012/0230255 | A1* | 9/2012 | Li | H04B 7/022 370/328 |
| 2012/0246510 | A1* | 9/2012 | Kojina | G06F 11/20 714/4.5 |
| 2013/0325996 | A1* | 12/2013 | Selig | H04L 12/42 709/208 |
| 2014/0018939 | A1 | 1/2014 | Ota et al. | |
| 2014/0153470 | A1* | 6/2014 | Suzuki | H04W 8/005 370/311 |
| 2014/0164452 | A1* | 6/2014 | Ying | G06F 16/182 707/827 |
| 2014/0281381 | A1* | 9/2014 | Lee | G06F 9/3877 712/31 |
| 2015/0220468 | A1* | 8/2015 | Miyashita | G05B 19/4185 710/110 |
| 2015/0381765 | A1* | 12/2015 | Hasse | H04L 12/4015 709/208 |
| 2016/0306759 | A1* | 10/2016 | Ham | H04L 12/403 |
| 2017/0267193 | A1 | 9/2017 | Wakita | |

FOREIGN PATENT DOCUMENTS

| | | |
|---|---|---|
| CN | 103428217 A | 12/2013 |
| CN | 103577424 A | 2/2014 |
| CN | 107025139 A | 8/2017 |
| JP | 2001-325011 A | 11/2001 |
| JP | 2012-194683 A | 10/2012 |
| JP | 2017-168994 A | 9/2017 |
| WO | 2009021060 A2 | 2/2009 |
| WO | 2010/073313 A1 | 7/2010 |

OTHER PUBLICATIONS

Written Opinion ("WO") of PCT/JP2019/009240 dated Jun. 4, 2019.

Anonymous: Fieldbus—Wikipedia, Feb. 15, 2018, XP055850492, pp. 1-10, Retrieved from the Internet: URL:https://en.wikipedia.org/w/index.php?title=Fieldbus&oldid=825762943[retrieved on Oct. 12, 2021]; Cited in EESR issued on Oct. 21, 2021 in a counterpart European patent application.

Anonymous: Profibus—Wikipedia—Mar. 12, 2018, XP055850747, pp. 1-6, Retrieved from the Internet: URL: https://en.wikipedia.org/w/index.php?title=Profibus&oldid=830055448 [retrieved on Oct. 13, 2021]; Cited in EESR issued on Oct. 21, 2021 in a counterpart European patent application.

Anonymous: "Foundation(tm) fieldbus Primer Revision 1.1", Jun. 24, 2001, XP055850754, pp. 1-36, Retrieved from the Internet: URL:http://www.fieldbusinc.com/downloads/primer1_1.pdf [retrieved on Oct. 13, 2021]; Cited in EESR issued on Oct. 21, 2021 in a counterpart European patent application.

Extended European search report (EESR) dated Oct. 21, 2021 in a counterpart European patent application.

Office Action (CNOA) dated May 11, 2021 in an counterpart Chinese patent application.

* cited by examiner

NETWORK SYSTEM HAVING MASTER DEVICE CARRYING OUT PART OF A PROCESS AND SLAVE DEVICE CARRYING OUT REMAINDER OF THE PROCESS

TECHNICAL FIELD

The present invention relates to a network system.

BACKGROUND ART

Patent Literature 1 describes a technique for constructing, with efficiency and less burden, a controller system in which one application program is divided into a plurality of divided programs and distributed to a plurality of controllers.

CITATION LIST

Patent Literature

[Patent Literature 1]
Japanese Patent Application Publication Tokukai No. 2001-325011

SUMMARY OF INVENTION

Technical Problem

During an operation of a network system, it may become necessary to modify or extend the system. For example, in a case where an existing network system is extended, the hardware ability of a programmable logic controller (hereinafter referred to as "PLC") used for managing the network system may become insufficient. In such a case, generally, the PLC is changed to another PLC having a higher performance, or the network system is divided.

This, however, requires newly making an equipment investment and requires designing for achieving synchronization in which a cycle of communication of each of network systems, into which the existing network system has been divided, is synchronized with a cycle of control of a corresponding one of a plurality of PLCs for controlling the respective network systems.

The present invention provides a mechanism in which, even in a case where a load of a process is beyond the performance of an existing master device, neither division of a network nor new designing is necessary in order to distribute the load.

Solution to Problem

An aspect of the present invention is a network system, including: a first master device configured to carry out, in every cycle, (i) a process of receiving data from a first slave device, (ii) a process of carrying out, in accordance with pre-allocation, a part of a first process with respect to the data which has been received, (iii) a process of transmitting data corresponding to a remainder of the first process to an outside entity in accordance with the pre-allocation and receiving a result corresponding the remainder of the first process, and (iv) a process of transmitting, to the first slave device, a result corresponding to the first process; at least one second master device configured to transmit, to the first master device before a period allocated to the first process within the cycle ends, the result corresponding to the remainder of the first process with respect to the data received from the first master device; a first network configured to transmit data between the first slave device and the first master device; and a second network configured to transmit data between the first master device and the at least one second master device.

Advantageous Effects of Invention

According to the above-described aspect of the present invention, even in a case where a load of a process is beyond the performance of an existing master device, neither division of a network nor new designing is necessary in order to distribute the load.

DESCRIPTION OF EMBODIMENTS

The following description will discuss embodiments of the present invention in detail with reference to the attached drawings.

Embodiment 1

Figure 1:
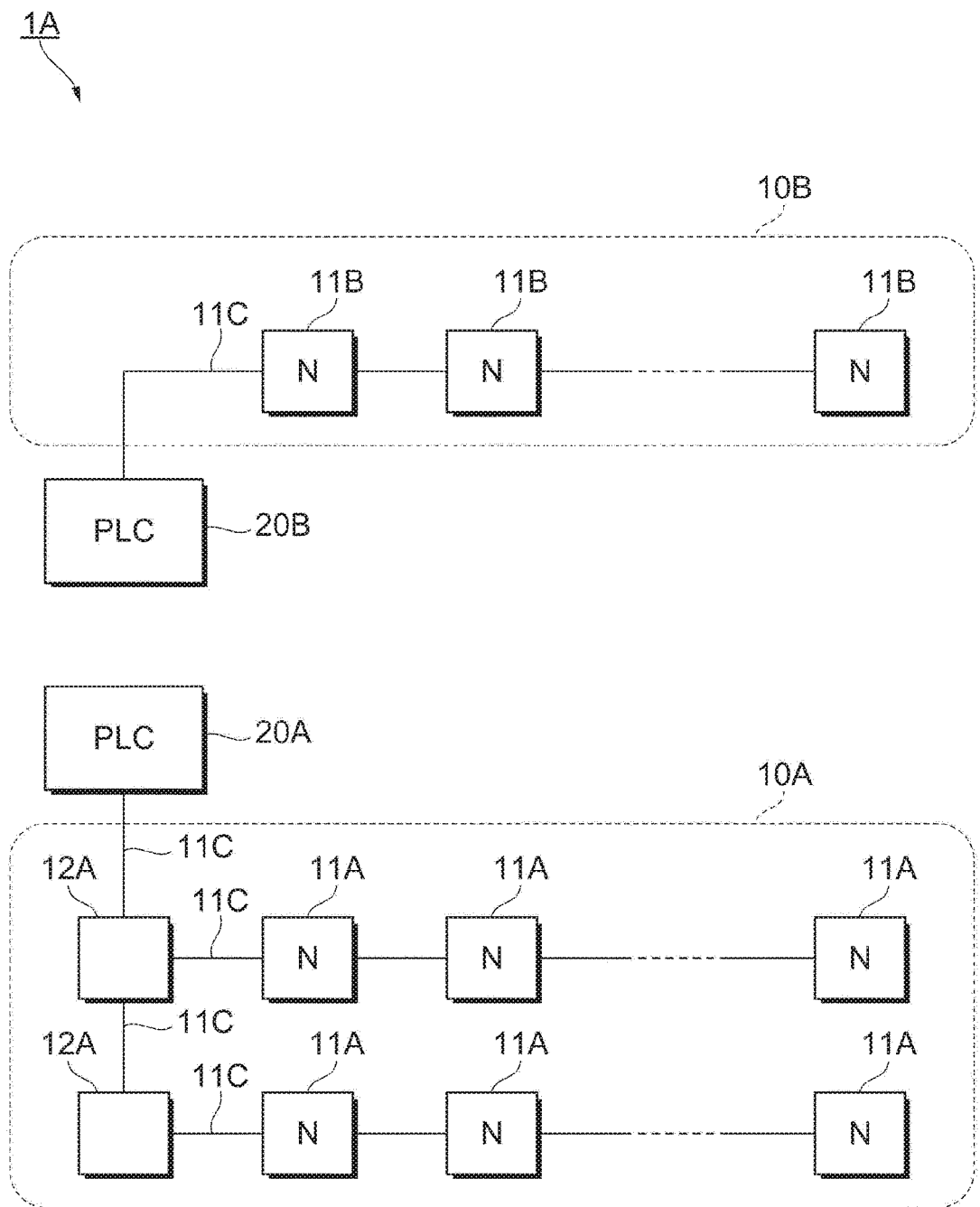
FIG. 1 is a view illustrating an example of a configuration of a network system which has not been extended.

<Example of Configuration of Network System which has not been Extended>
FIG. 1 is a view illustrating an example of a configuration of a network system 1A which has not been extended (hereinafter referred to as "network system 1A").

It is assumed here that the network system 1A is used in fields such as process automation, factory automation, and motion control, in which real-time response and high durability are required in communication between nodes.

The network system 1A illustrated in FIG. 1 includes two industrial networks independent of each other. In Embodiment 1, being "independent" means that the two industrial networks are separate from each other.

"Industrial network" is a generic term for networks used in the above-mentioned process automation, factory automation, motion control, and the like.

Here, one of the two industrial networks is referred to as a first industrial network 10A and the other is referred to as a second industrial network 10B.

The first industrial network 10A includes (i) a plurality of devices 11A to be controlled and/or managed and (ii) a communication cable 11C connecting the plurality of devices 11A to each other. Each of the plurality of devices 11A is, for example, a motor, an actuator, an input/output device for inputting or outputting a signal or data, any of various kinds of sensors, a sensor communication unit, an inverter, a servo, or the like.

The first industrial network 10A includes two branch slaves 12A, to each of which two or more of the plurality of devices 11A are connected in series. The two or more devices 11A corresponding to each line are connected to each other through the communication cable 11C. By dividing the first industrial network 10A into a plurality of lines, it is possible to limit an area of influence of a failure that may occur in a device 11A.

Connected to the first industrial network 10A is a PLC 20A which time-sequentially carries out (i) transmission of data to each device 11A, (ii) reception of data from each device 11A, and (iii) processing of data received from each device 11A.

In other words, the PLC 20A is used to control the plurality of devices 11A and to collect information generated by the plurality of devices 11A.

The PLC 20A operates as a master device to the plurality of devices 11A. Note that the plurality of devices 11A operate as slave devices to the PLC 20A.

As illustrated in FIG. 1, there is one (1) master device for the first industrial network 10A.

The second industrial network 10B also includes (i) a plurality of devices 11B to be controlled and/or managed and (ii) a communication cable 11C connecting the plurality of devices 11B to each other.

Note that the second industrial network 10B in FIG. 1 is formed by connecting the plurality of devices 11B in series on a single line.

Each of the plurality of devices 11B may also be, for example, a motor, an actuator, an input/output device for inputting or outputting a signal or data, any of various sensors, a sensor communication unit, an inverter, a servo, or the like. In this example, the plurality of devices 11B are daisy-chained.

Connected to the second industrial network 10B is a PLC 20B which time-sequentially carries out (i) transmission of data to each device 11B, (ii) reception of data from each device 11B, and (iii) processing of data received from each device 11B. The PLC 20B is also used to control the plurality of devices 11B and to collect information generated by the plurality of devices 11B.

The PLC 20B operates as a master device to the plurality of devices 11B. Note that the plurality of devices 11B operate as slave devices to the PLC 20B.

As illustrated in FIG. 1, there is one (1) master device for the second industrial network 10B.

The first industrial network 10A is an example of a first network, and the second industrial network 10B is an example of a second network.

The PLC 20A is an example of a first master device, and the PLC 20B is an example of a second master device.

The plurality of devices 11A are each an example of a first slave device, and the plurality of devices 11B are each an example of a second slave device.

Each of the first industrial network 10A and the second industrial network 10B can have any physical network configuration and any logical network configuration (topology), not limited to the configuration illustrated in FIG. 1.

Further, the type and number of the plurality of devices 11A of the first industrial network 10A and the type and number of the plurality of devices 11B of the second industrial network 10B can each be any type and number.

For communication on the first industrial network 10A and communication on the second industrial network 10B, for example, EtherCAT (registered trademark) (Ethernet for Control Automation Technology), which is an example of industrial Ethernet, is used.

Connection using EtherCAT ensures synchronization between a cycle of control by the PLC 20A and a cycle of communication on the first industrial network 10A. Also, connection using EtherCAT ensures synchronization between a cycle of control by the PLC 20B and a cycle of communication on the second industrial network 10B.

The PLC 20A operating as a master device transmits, with use of one (1) frame, data generated for each slave (device 11A).

The each device 11A operating as a slave device (i) reads out the data addressed to the each device 11A and included in the frame which has been received and (ii) writes data that has been generated after a previous frame passed. That is, the each device 11A exchanges data at an instant when a frame passes the each device 11A. This operation is called "on-the-fly".

On the first industrial network 10A, for example, data is transmitted by full-duplex communication mode, and communication in a bandwidth of 200 (=2×100) Mbit/s is possible. For example, 1000 digital I/Os distributed to 100 nodes can be updated in 30 μs. Further, the times of the respective plurality of devices 11A connected to the first industrial network 10A can be synchronized with each other within 1 μs.

Under the standard, the first industrial network 10A can be connected to up to 65535 devices 11A.

The same applies to the PLC 20B and the plurality of devices 11B of the second industrial network 10B.

Figure 2:
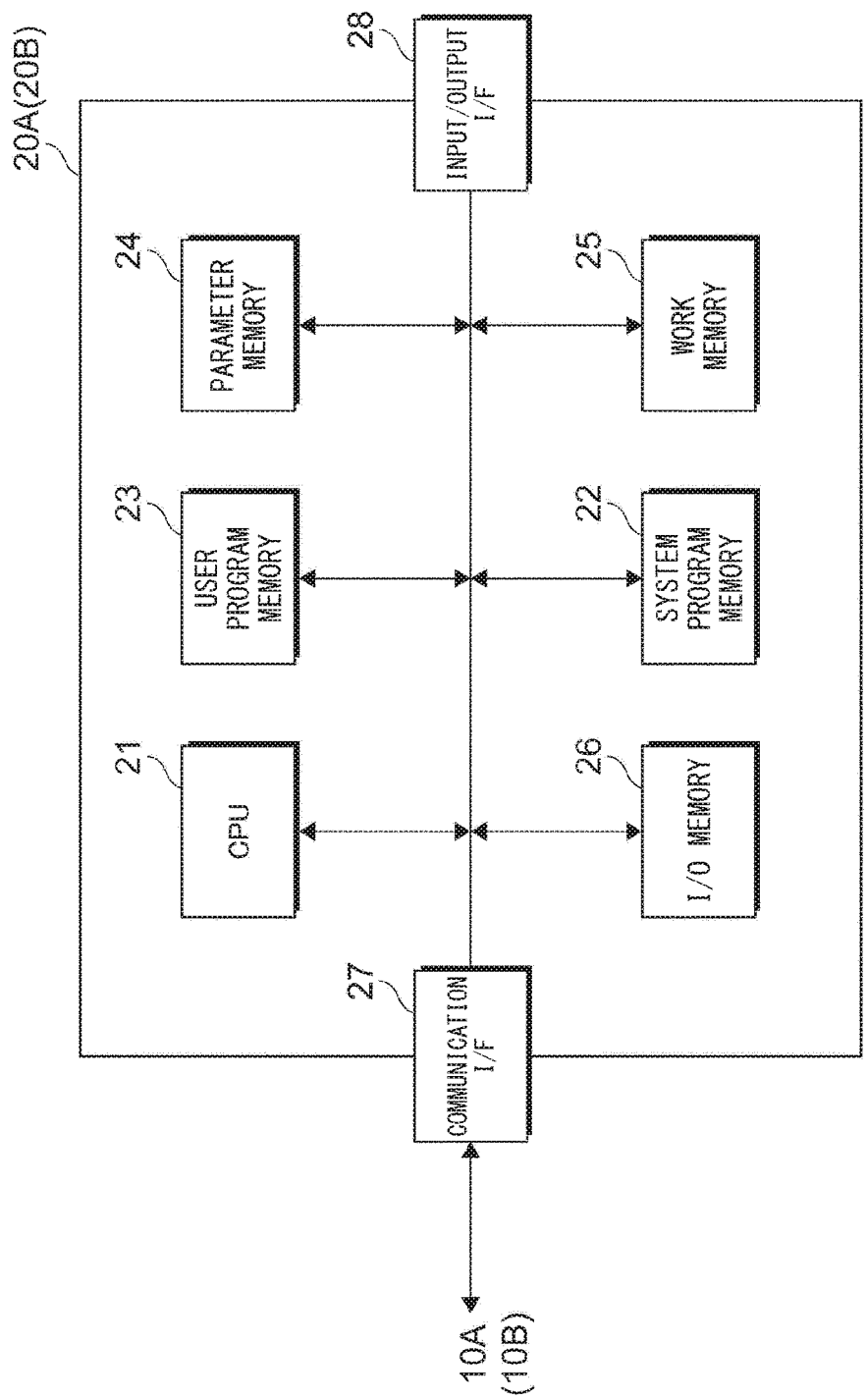
FIG. 2 is a view illustrating an example of a hardware configuration of a PLC.

FIG. 2 is a view illustrating an example of a hardware configuration of each of the PLC 20A and the PLC 20B.

The following description will discuss the PLC 20A as a representative of the PLC 20A and the PLC 20B.

The PLC 20A includes an arithmetic processor (CPU: Central Processing Unit) 21, a system program memory 22, a user program memory 23, a parameter memory 24, a work memory 25, an input/output memory (I/O memory) 26, a communication interface (communication I/F) 27, an input/output interface (input/output I/F) 28, and the like.

The arithmetic processor 21 controls the entire operation of the PLC 20A by executing a system program and a user program.

The system program memory 22 is a memory which stores the system program.

The user program memory 23 is a memory which stores the user program (here, the program executed by the PLC 20A) created by a user.

The parameter memory 24 is a memory which stores various parameters used by various calculations and processes carried out in the PLC 20A.

The work memory 25 is a memory which temporarily stores data used in the various calculations and processes.

The input/output memory (I/O memory) 26 is a memory used for referencing or rewriting, as a substitute for information that is inputted/outputted through execution of a program. The input/output memory 26 also stores parameters for respective program blocks.

The communication interface 27 includes, for example, a communication port used for connection with the first industrial network 10A, a communication port used for connection with another controller (a management computer or another PLC), and the like.

In Embodiment 1, EtherCAT having a communication band of approximately 200 M is used for communication between the PLC 20A and the first industrial network 10A.

For communication between the PLC 20A and the management computer, for example, EtherNet/IP (registered trademark) which is an industrial open network is used. Communication with the management computer may be carried out in an asynchronous manner and at a communication speed which does not need to be fast.

The input/output interface 28 includes a communication port used for connection with an input device and an output device.

Figure 3:
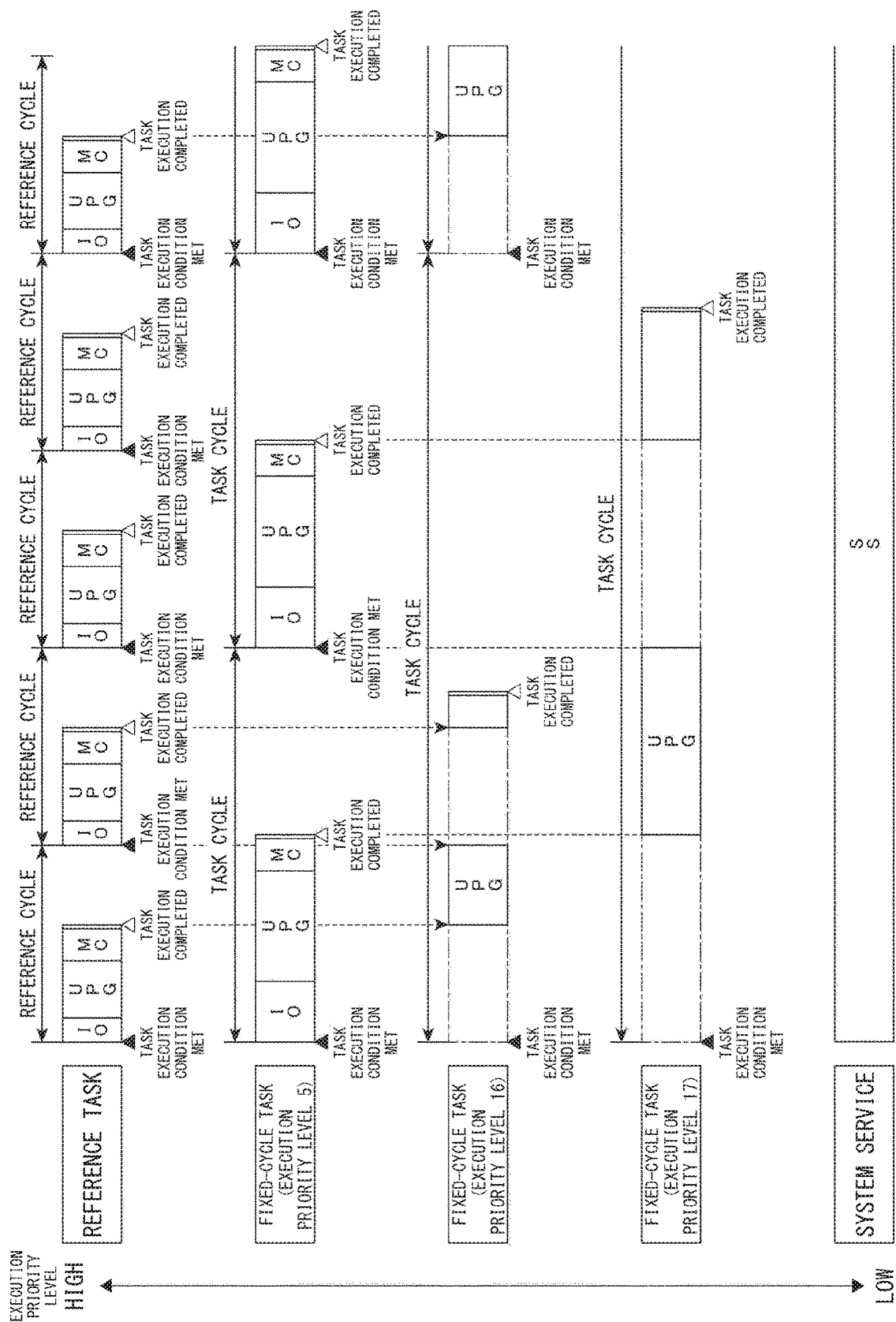
FIG. 3 is a view illustrating an example of a control sequence carried out by a PLC.

FIG. 3 is a view illustrating an example of a control sequence carried out by each of the PLC 20A and the PLC 20B.

In the following, an operation of the PLC 20A will be described as a typical example of the control sequence.

Processes (hereinafter referred to as "tasks") carried out by the PLC 20A are distinguished from each other by a difference between cycles that are allocated to execution of the respective processes. In Embodiment 1, a task whose cycle is the shortest is referred to as a reference task. The other tasks are called fixed-cycle tasks. A cycle of each fixed-cycle task is obtained by multiplying the cycle of the reference task (the reference cycle) by a constant number (2×, 3×, . . . ).

Thus, the reference task is allocated to a task for which a required level of response time from data input to data output is the highest (in other words, a task for which the highest process speed is required). The constant-multiple task, on the other hand, is used for a task for which a required level of response time is less demanding compared to the reference task. Of course, the smaller the constant number, the shorter the cycle of the fixed-cycle task. Note that in a case where the constant number is "1", the fixed-cycle task is the reference task.

In Embodiment 1, different levels of priority are set to the respective tasks, and a shorter cycle is allocated to a task having a higher level of priority. As such, the reference task is a task that is given the highest level of priority. FIG. 3 shows (i) the reference task, (ii) fixed-cycle tasks to be carried out with 5th, 16th, and 17th highest levels of priority, respectively, and (ii) a system service.

The PLC 20A in Embodiment 1 carries out these tasks in parallel. That is, the PLC 20A carries out multitasking. One or more tasks are allocated to control and/or management of each device 11A (see FIG. 1).

Each task is started in response to an execution condition being met. A part of the fixed-cycle tasks is triggered by a start and/or a completion of another task. As illustrated in FIG. 3, each task is made up of a period (IO) for transmitting and receiving data to and from a device 11A, a period (UPG) for processing data, which has been received from a device 11A, through execution of the user program, and a period (MC) for carrying out motion control. In the period (MC) for carrying out the motion control among these periods, an instruction from a motion control command included in the user program is carried out. Note that "IO" is an abbreviation for "I/O refresh period", which will be described later.

Figure 4:
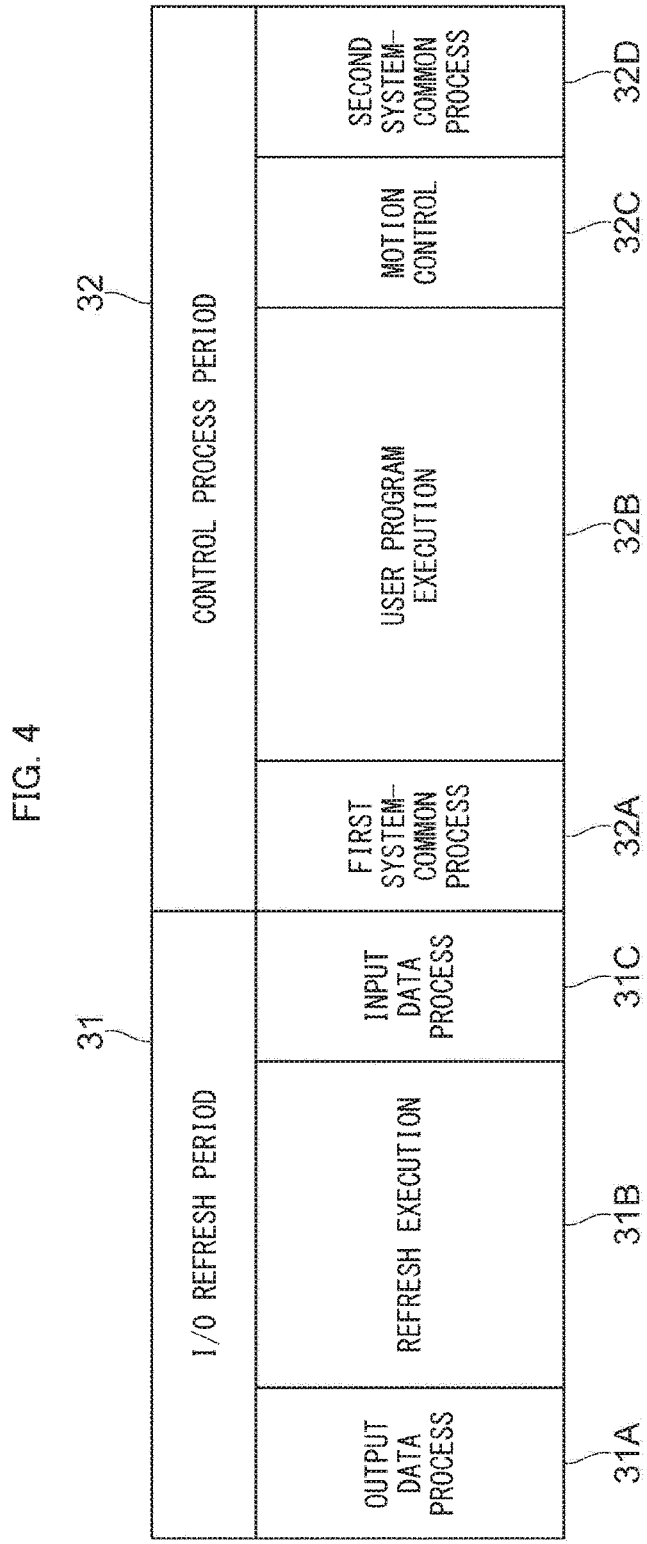
FIG. 4 is a view illustrating an example of a configuration of a task.

FIG. 4 is a view illustrating an example of a configuration of a task.

As illustrated in FIG. 4, each task is made up of two periods, i.e., an I/O refresh period 31 and a control process period 32, in this order from the beginning of the each task.

The I/O refresh period 31 is made up of an output data process 31A; refresh execution 31B; and an input data process 31C in this order from the beginning of the I/O refresh period 31. The output data process 31A prepares for data transmission carried out by the communication interface 27 (see FIG. 2). The refresh execution 31B carries out transmission of data from the communication interface 27 to the first industrial network 10A and reception of data from the first industrial network 10A. The input data process 31C carries out: determination of whether or not a conditional expression regarding execution of the each task is met; taking in of data received from communication interface 27; and the like.

The control process period 32 is made up of a first system-common process 32A, user program (UPG) execution 32B, motion control (MC) 32C, and a second system-common process 32D in this order from the beginning of the control process period 32.

In the system-common process, self diagnosis (e.g., failure detection and the like) is carried out.

<Configuration of Network System which has been Extended>

Figure 5:
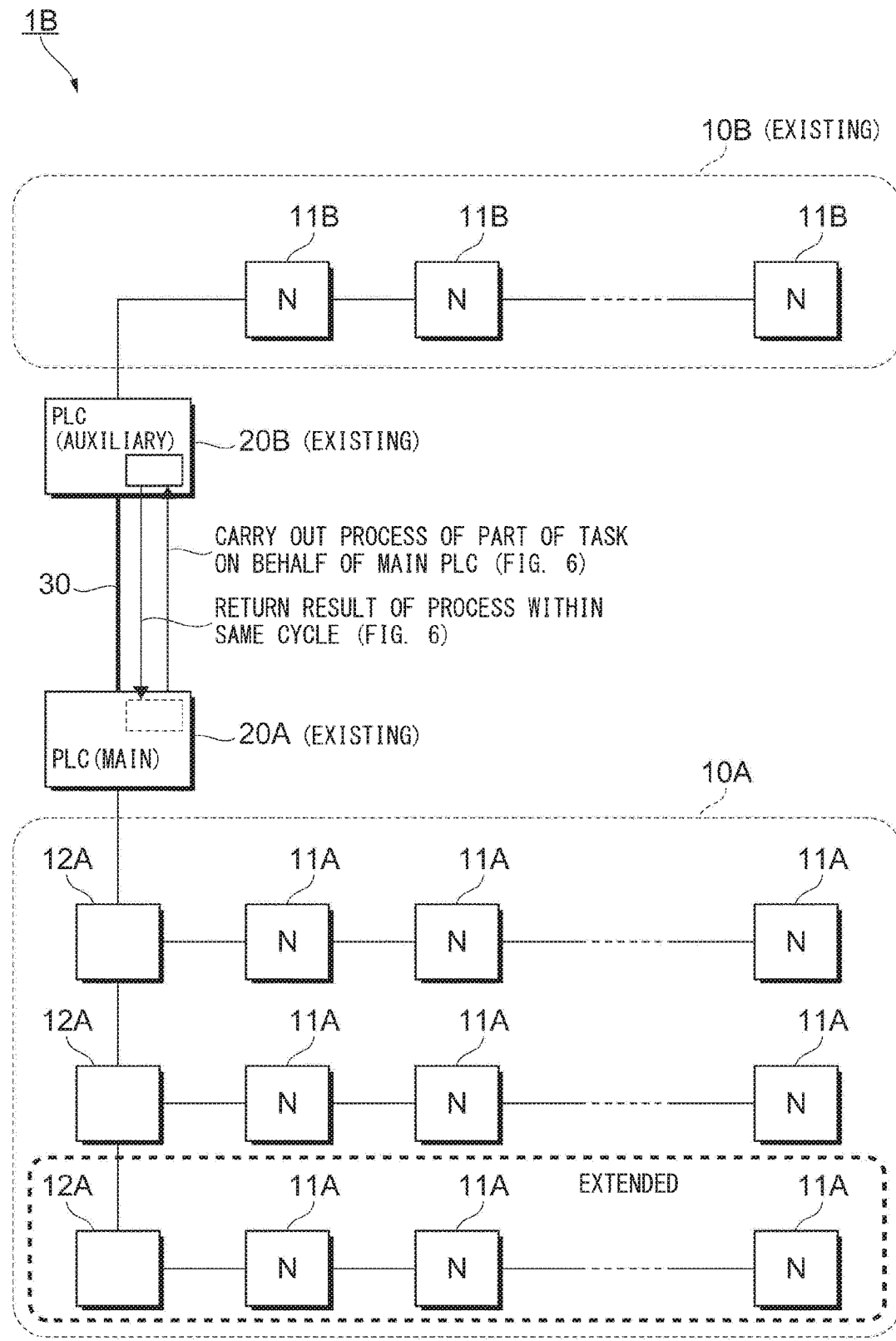
FIG. 5 is a view illustrating an example of a configuration of a network system which has been extended.

FIG. 5 is a view illustrating an example of a configuration of a network system 1B which has been extended (hereinafter referred to as "network system 1B").

In FIG. 5, the same reference signs are given to members each corresponding to a member illustrated in FIG. 1.

The network system 1B differs from the network system 1A (see FIG. 1) in that, in the network system 1B, the number of lines of the first industrial network 10A is larger than the number of lines of the network system 1A (see FIG. 1). In FIG. 5, a line that has been added (i.e., an extended portion) is outlined in thicker broken line.

The PLC 20A is required to have a calculation capability for controlling not only devices 11A and branch slaves 12A that were already included before the extension but also devices 11A and a branch slave 12A that have been added.

In a case where a data size necessary for storing programs increases due to addition of a new program and/or an update of a program, the PLC 20A requires a memory resource necessary for storing these programs.

Here, it is assumed that a remaining capacity of a memory resource and/or a remaining capacity of a calculation capability of the existing PLC 20A do(es) not satisfy a memory resource and a calculation capability that are necessary for control of the devices 11A and the like that have been added.

Shortage of a memory resource means that there is not enough capacity for storing a program used for controlling the devices 11A.

Shortage of a calculation capability means that a task (such as an IO refresh, a common process, a program execution process, or a peripheral service process) is not finished within a corresponding cycle.

As such, Embodiment 1 employs a mechanism in which, when a performance (a calculation capability and a memory resource) of the PLC 20A becomes insufficient for control of the first industrial network 10A which has been extended, the performance is assisted by the existing PLC 20B which is used for control of the second industrial network 10B.

In Embodiment 1, the PLC 20A which controls the first industrial network 10A is referred to as a main PLC, and the PLC 20B which controls the second industrial network 10B is referred to as an auxiliary PLC.

However, in order to use the existing PLC 20B as an auxiliary PLC, there are conditions to be satisfied.

The first one of the conditions is that there is a remaining capacity of a calculation capability of the PLC 20B. The PLC 20B needs to carry out control of the second industrial network 10B and cannot be operated as an auxiliary PLC if operating as the auxiliary PLC causes a problem in the control.

The second one of the conditions is that the remaining capacity in the calculation capability is greater than a calculation capability required for a process (a part exceeding the calculation capability of the PLC 20A) to be carried out by the PLC 20B on behalf of the PLC 20A. Note that in a case where sufficient calculation capability cannot be secured by the calculation capability of the PLC 20B alone, setting another auxiliary PLC is considered.

In Embodiment 1, the PLC 20A serving as the main PLC and the PLC 20B serving as the auxiliary PLC are connected to each other via a high-speed/synchronization network 30.

Here, the high-speed/synchronization network 30 employs, for example, TSN standards which have been standardized by a TSN (Time Sensitive Networking) task group of IEEE 802.1. The TSN standards enable, for example, communication in a bandwidth of not less than 1 gigabit/s and synchronization between nodes (i.e., between PLCs) within tens of nanoseconds.

That is, the high-speed/synchronization network 30 enables synchronization among (i) a cycle of control carried out by the main PLC (PLC 20A), (ii) a cycle of control carried out by the auxiliary PLC (PLC 20B), and (iii) a cycle of communication.

In Embodiment 1, it is assumed that a partial process that is beyond the calculation capability of the PLC 20A is, for example, sequence control of ladder or the like, motion axis control, safety control, or robot control.

Note, however, that the partial process need not be an entire program. For example, the partial process may be a part of a calculation process of an image analysis algorithm, as long as the part is a unit of a divisible calculation process.

Figure 6:
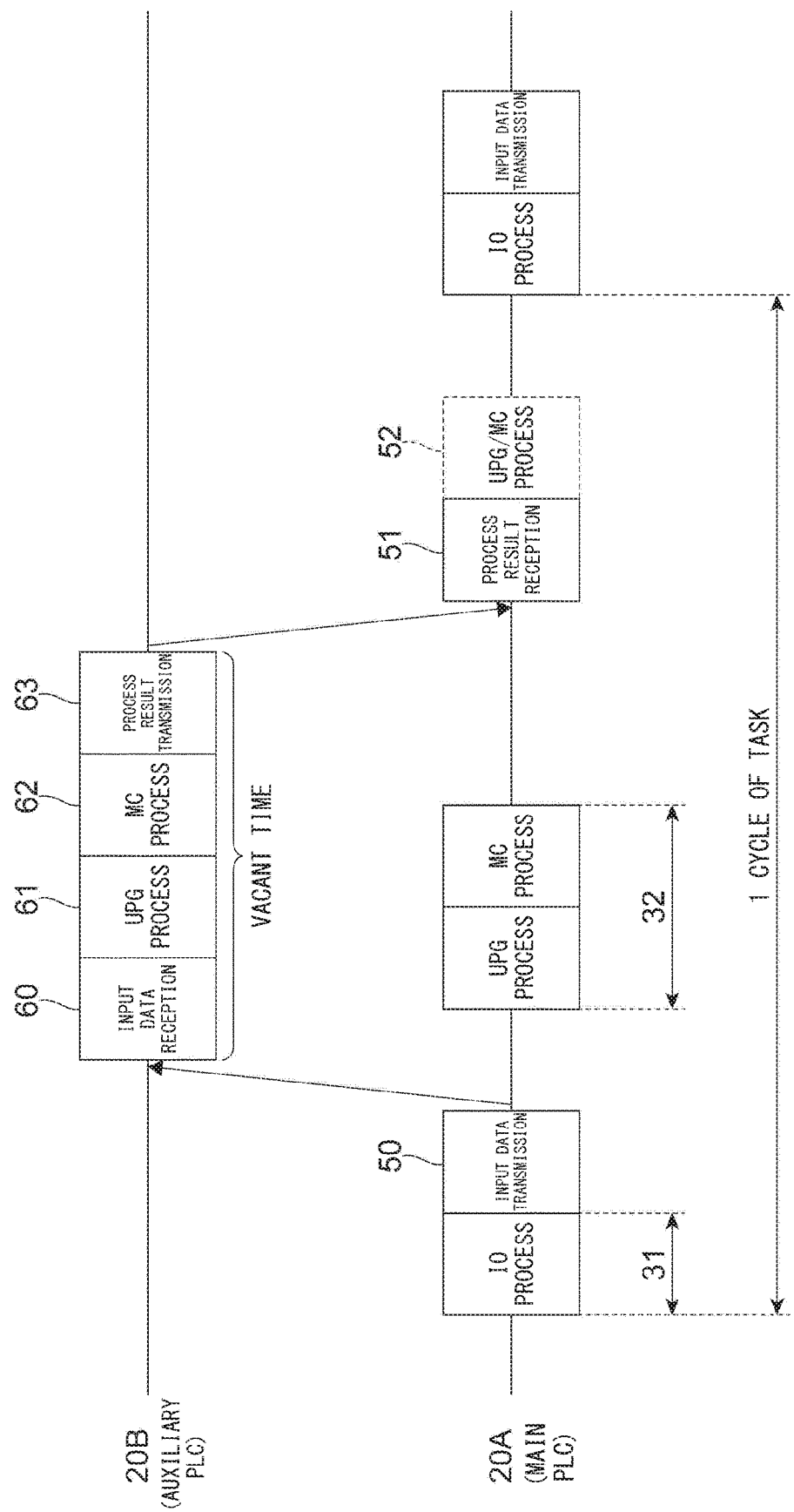
FIG. 6 is a view illustrating an example of a relationship between a control sequence of a main PLC and a control sequence of an auxiliary PLC.

FIG. 6 is a view illustrating an example of a relationship between a control sequence of the main PLC and a control sequence of the auxiliary PLC.

In the control sequence of the main PLC, a period (input data transmission 50) for transmitting, to the auxiliary PLC, data required by a process carried out by the auxiliary on behalf of the main PLC and a period (process result reception 51) for receiving, from the auxiliary PLC, a result of the process carried out by the auxiliary PLC on behalf of the main PLC are arranged to be within the same task.

In other words, the main PLC is able to cause a result of a process (including a result of a process carried out by the auxiliary PLC) carried out on data received in a certain cycle (N-th cycle) to be reflected in transmission carried out in a subsequent cycle ((N+1)-th cycle).

Note that it is only necessary that transmission (the input data transmission 50) of data to the auxiliary PLC be carried out at a timing that is after reception of data required in a process carried out by the auxiliary PLC on behalf of the main PLC. As such, the timing of the input data transmission 50 is not limited to after the IO refresh period (IO process) 31. For example, the input data transmission 50 may overlap with the IO refresh period (IO process) 31. Alternatively, for example, the input data transmission 50 may overlap with the control process period 32.

This is, however, on the precondition that a process in the IO refresh period (IO process) 31 carried out by the main PLC and a process in an IO refresh period (not illustrated) carried out by the auxiliary PLC are not affected. If these processes are affected, transmission and reception of data to and from a device 11A and a device 11B cannot be performed correctly.

In the case illustrated in FIG. 6, a period 52 corresponding to the user program (UPG) execution 32B (see FIG. 4) and a part of the motion control (MC) execution 32C (see FIG. 4) follows the process result reception 51. The period 52 is provided in a case where there are a user program (UPG) and a motion control (MC) that use a result of a process carried out by the auxiliary PLC on behalf of the main PLC. In other words, a user program (UPG) and a motion control (MC) that require a result of a process carried out by the auxiliary PLC on behalf of the main PLC are suspended until the result of the corresponding process is received.

As such, in a case where a result of a process carried out by the auxiliary PLC on behalf of the main PLC can be used as it is in transmission of the next cycle ((N+1)-th cycle), there is no need to have the period 52. For this reason, the period 52 is indicated by a broken line in FIG. 6.

The control sequence of the auxiliary PLC has: a period (input data reception 60) for receiving data from the main PLC; user program execution (UPG process 61) carried out by the auxiliary PLC on behalf of the main PLC; motion control execution (MC process 62) carried out by the auxiliary PLC on behalf of the main PLC; and a period (process result transmission 63) for transmitting results of these processes to the main PLC.

These processes are each carried out with use of a period that is not used for control of the device 11B (see FIG. 5), which control should be preferentially carried out by the auxiliary PLC. Thus, respective periods are not necessarily contiguous. For example, the input data reception 60 and the user program execution (UPG process 61) may be temporally separated from each other. The motion control execution (MC process 62) and the process result transmission 63 may be temporally separated from each other.

Note that, depending on the process to be taken over, only one of the user program execution (UPG process 61) and the motion control execution (MC process 62) may be executed.

<Advance Preparations>

The following description will discuss advance preparations to be carried out before a start of an operation of the first industrial network 10A (see FIG. 5) which has been extended.

Figure 7:
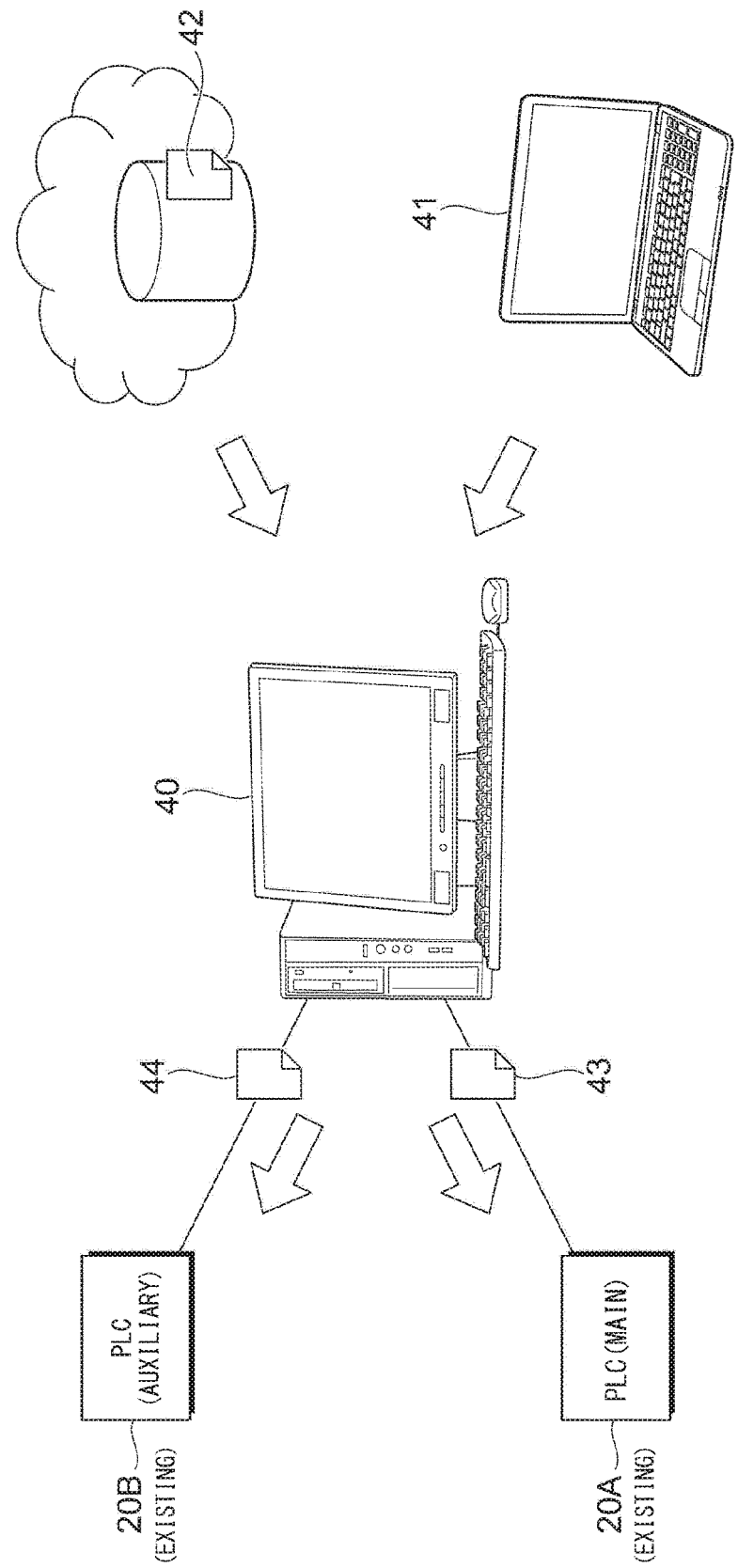
FIG. 7 is a view illustrating an example of a system configuration used in advance preparations for using an existing PLC as a main PLC and using another existing PLC as an auxiliary PLC.

FIG. 7 is a view illustrating an example of a system configuration used in advance preparations for using the existing PLC 20A as a main PLC and the other existing PLC 20B as an auxiliary PLC.

As illustrated in FIG. 7, the PLC 20A and the PLC 20B are connected to a computer 40.

The computer 40 carries out a process of determining, through a load simulation (described later), control sequences to be used in the respective PLCs.

The computer 40 also carries out a process of causing the control sequences thus determined to be downloaded to the respective PLCs 20A and 20B.

The computer 40 may be a general-purpose computer or a PLC. The computer 40 here is an example of a management device.

Information necessary for the advance preparations is taken into the computer 40 via a setting computer 41 or a cloud database 42.

Examples of the information necessary for the advance preparations include: hardware performances of the respective PLCs 20A and 20B; contents of control processes to be carried out by the respective PLCs 20A and 20B; configurations of the first industrial network 10A and the second industrial network 10B; conditions to be satisfied by respective controls; and the like.

The computer 40 runs a load simulation by providing a load simulator (program) with the information which has been taken in, and causes pieces of information of setting (a control sequence, a program, and the like) 43 and 44 to the respective PLCs 20A and 20B. The piece of information 43 is for the main PLC, and the piece of information 44 is for the auxiliary PLC.

Figure 8:
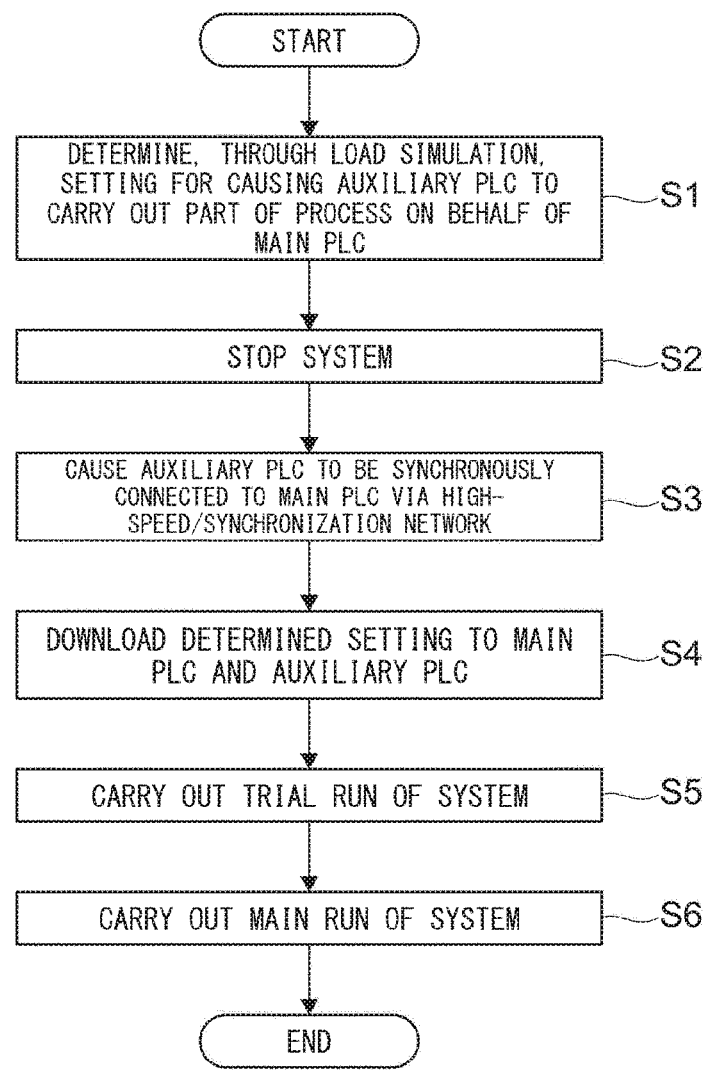
FIG. 8 is a flowchart illustrating an example of an operation carried out during the course of advance preparations.

FIG. 8 is a flowchart illustrating an example of an operation carried out during the course of the advance preparations.

First, a user operates the computer 40 (see FIG. 7) so as to cause the computer 40 to execute the load simulator, thereby determining a setting for causing a part of a process of the main PLC to be carried out by the auxiliary PLC on behalf of the main PLC (Step 1). Details of this operation will be described later.

When the setting is determined, the user stops the network system 1B (see FIG. 5) (Step 2). Specifically, the first industrial network 10A (see FIG. 5) controlled by the PLC 20A (see FIG. 5) to be caused to operate as the main PLC and the second industrial network 10B (see FIG. 5) controlled by the PLC 20B (see FIG. 5) to be caused to operate as the auxiliary PLC are stopped.

Subsequently, the user causes the PLC 20B, which is to be caused to operate as the auxiliary PLC, to be synchronously connected via the high-speed/synchronization network 30 (see FIG. 5) to the PLC 20A, which is to be caused to operate as the main PLC (Step 3).

Next, the user operates the computer 40 so as to download the setting, which has been determined, to the PLC 20A which operates as the main PLC and to the PLC 20B which operates as the auxiliary PLC (Step 4).

When the downloading ends, the user carries out a trial run of the network system 1B (Step 5). In a case where the test run is successful, the user switches the network system 1B to a main run (Step 6).

Figure 9:
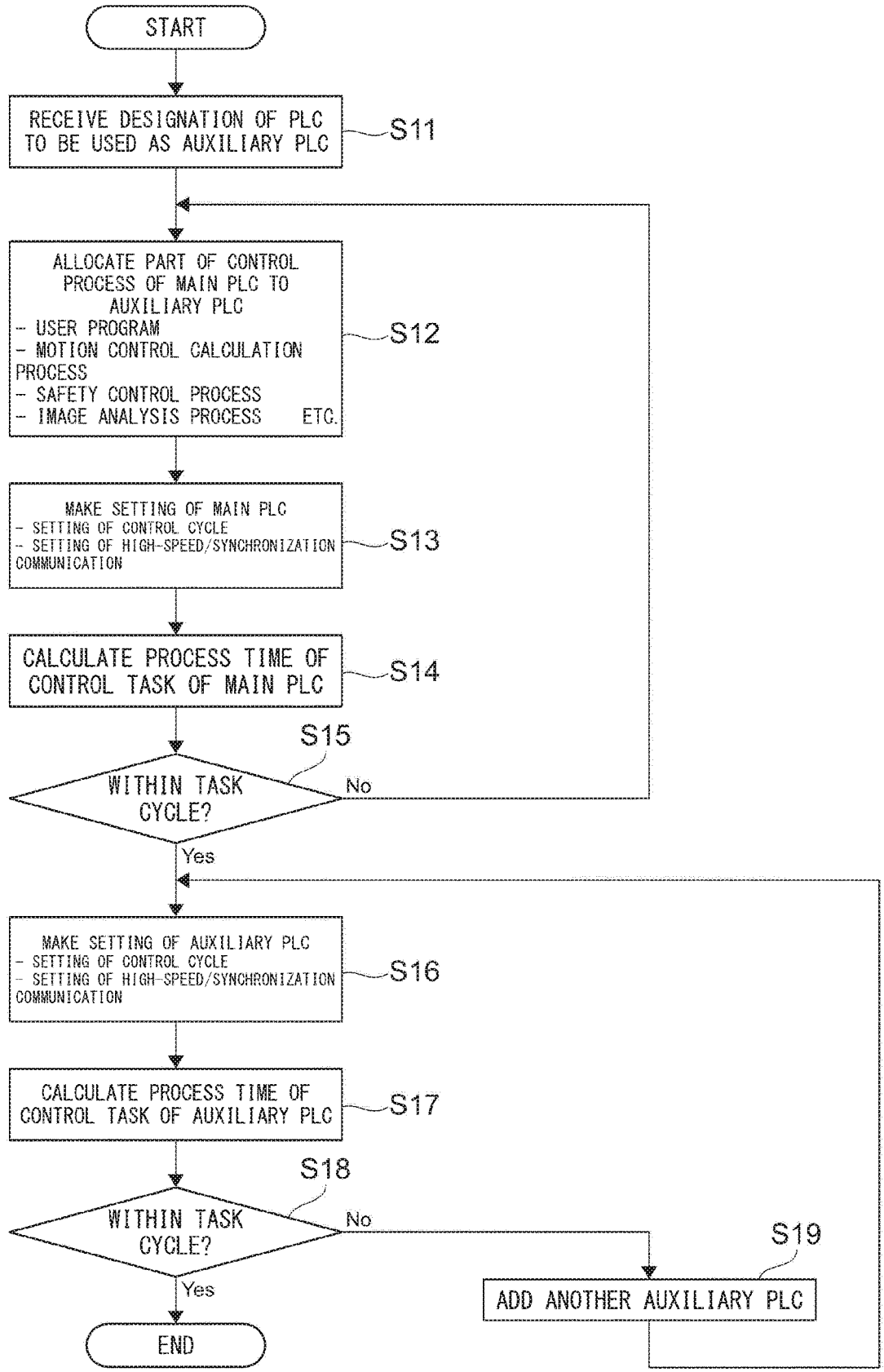
FIG. 9 is a flowchart illustrating a process operation of a load simulator that is executed in order to determine a setting for causing a part of a process of a main PLC to be carried out by an auxiliary PLC on behalf of the main PLC.

FIG. 9 is a flowchart illustrating a process operation of the load simulator that is executed in order to determine the setting for causing a part of a process of the main PLC to be carried out by the auxiliary PLC on behalf of the main PLC.

First, the load simulator receives designation of a PLC to be used as the auxiliary PLC (Step 11).

Next, the load simulator allocates a part of a control process of the main PLC to the auxiliary PLC (Step 12). Examples of an item to be allocated include a user program, a motion control calculation process, a safety control process, an image analysis process, and the like. The process to be allocated is randomly determined. Here, a unit of allocation may any divisible unit, such as a part of the process. Note that a synchronization setting is the same before and after the extension.

Next, the load simulator sets a control sequence of the main PLC (Step 13). Specifically, a control cycle of the main PLC and a communication timing of the high-speed/synchronization network 30 (see FIG. 5) are set.

Subsequently, the load simulator calculates a process time of a control task to be carried out by the main PLC (Step 14).

Once the process time has been calculated, the load simulator determines whether or not the process time falls within a task cycle (Step 15).

In a case where a negative result is obtained at Step 15, the load simulator returns to Step 12 and changes the part of the control process which part is to be assigned to the auxiliary PLC. This change is repeated until an affirmative result is obtained at Step 15.

In a case where an affirmative result is obtained at Step 15, the load simulator sets a control sequence of the auxiliary PLC (Step 16). Specifically, a control cycle of the auxiliary PLC and a communication timing of the high-speed/synchronization network 30 (see FIG. 5) are set.

Here, in a case where a result of a process of the auxiliary PLC is to be used by the main PLC for calculation (in a case where the process 52 illustrated in FIG. 6 is to be carried out), it is also checked whether or not the control cycle of the auxiliary PLC has been set so as to be within the control cycle of the main PLC. Note that a synchronization setting is the same before and after the extension.

Subsequently, the load simulator calculates a process time of a control task to be carried out by the auxiliary PLC (Step 17).

Once the process time has been calculated, the load simulator determines whether or not the process time is within a task cycle (Step 18).

In a case where an affirmative result is obtained at Step 18, the load simulator ends the series of processes. In such a case, the control sequence of the main PLC and the control sequence of the auxiliary PLC are determined. These control sequences each include determination of a process to be carried out by the corresponding PLC.

In a case where a negative result is obtained at Step 18, the load simulator adds another auxiliary PLC (Step 19), and then returns to step 16. At this time, a control process that can be carried out by the first auxiliary PLC within the task cycle is determined, and the remainder is allocated to the auxiliary PLC which is added. Note that it is also possible to search for an auxiliary PLC that can take over a portion of the control process of the main PLC.

Operation Example

Figure 10:
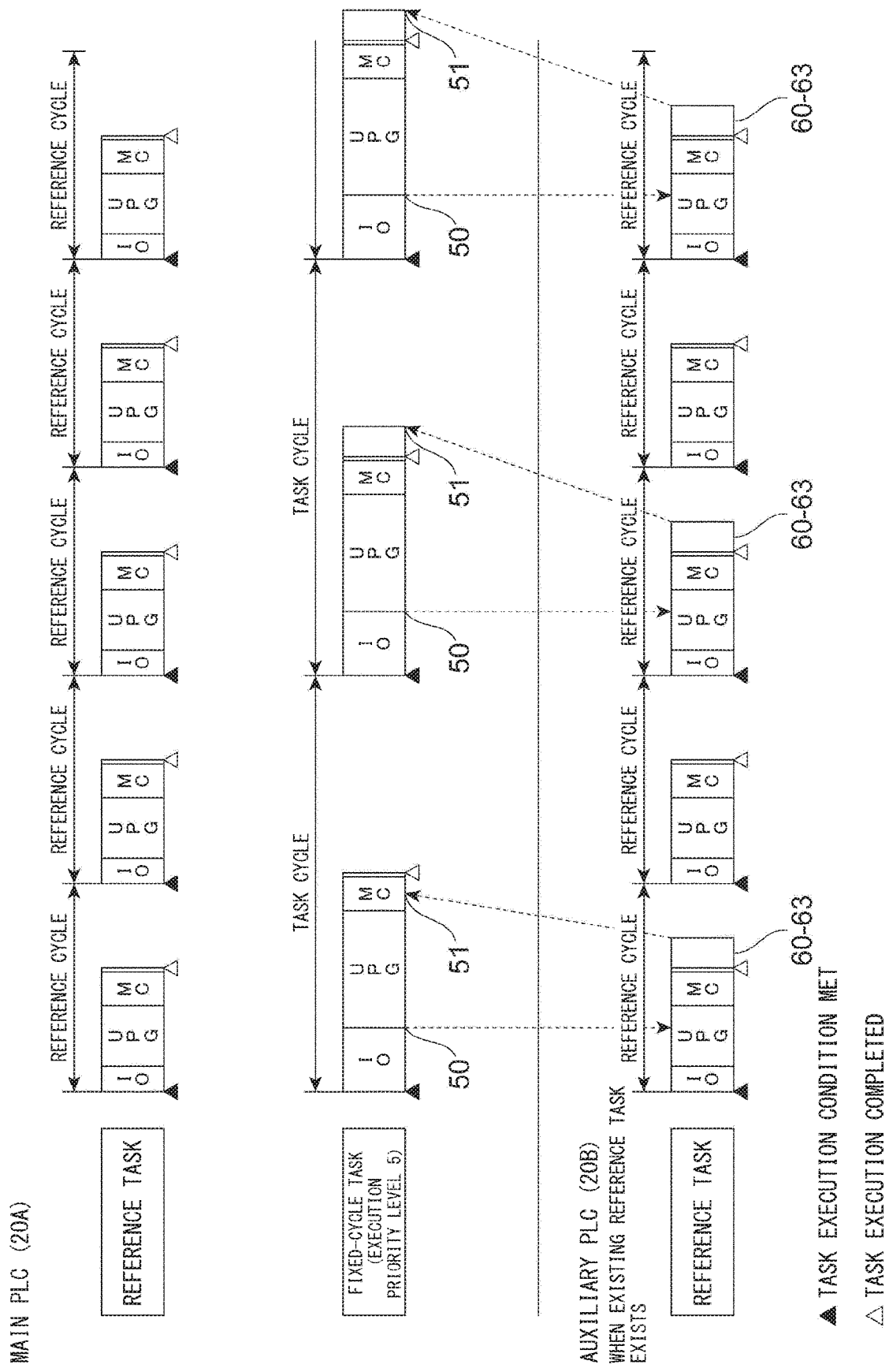
FIG. 10 is a view illustrating an example of a relationship between a control sequence of a main PLC of a network system which has been extended and a control sequence of an auxiliary PLC.

FIG. 10 is a view illustrating an example of a relationship between a control sequence of the main PLC (PLC 20A) of the network system 1B which has been extended (see FIG. 5) and a control sequence of the auxiliary PLC (PLC 20B).

In the case illustrated in FIG. 10, two types of tasks (a reference task and a fixed-cycle task) are carried out by the main PLC, and one (1) type of task (a reference task) is carried out by the auxiliary PLC. It should be noted that the illustrated tasks are a part of tasks carried out by the main PLC and the auxiliary PLC.

In FIG. 10, a part of a process of the fixed-cycle task (a nonreference task) to be carried out by the main PLC is allocated to the auxiliary PLC.

Note here that a user program process (a UPG process) and a motion control process (an MC process) which are carried out immediately after an IO refresh period (an IO process) in each task of the main PLC are examples of a first process.

A user program process (a UPG process) and a motion control process (an MC process) which are immediately after an IO refresh period (an IO process) in the task of the auxiliary PLC are examples of a second process.

In this instance, a task cycle of a fixed-cycle task whose process is partially distributed is twice a reference cycle. The duration of a reference cycle is the same between the main PLC and the auxiliary PLC. Thus, the auxiliary PLC receives data from the main PLC at a frequency of once every two reference cycles. That is, the auxiliary PLC carries out a process on behalf of the main PLC at a frequency of once every two reference cycles.

In this instance, the auxiliary PLC carries out processes 60 through 63 (see FIG. 6) on behalf of the main PLC, (i) within a reference cycle in which the auxiliary PLC has received data and (ii) after completing a task process as a master device. The main PLC receives a result of the process within the same task cycle.

Accordingly, the control sequence of the main PLC before addition (extension) of a line is basically maintained, so that no problem is caused in control of the first industrial network 10A (see FIG. 5) carried out by the main PLC.

Further, the auxiliary PLC is also able to complete, within the reference cycle, the reference task including the process carried out by the auxiliary PLC on behalf of the main PLC. Accordingly, no problem is caused in control the second industrial network 10B (see FIG. 5) carried out by the auxiliary PLC.

It is assumed that the auxiliary PLC in FIG. 10 is capable of independently carrying out a communication as the master device and a communication with the main PLC. As such, even in a case where the auxiliary PLC receives data from the main PLC during an IO refresh period (an IO process) of a slave device, the auxiliary PLC operates without a problem.

In some cases illustrated in FIG. 10, the main PLC receives a notification of a result of a process from the auxiliary PLC after execution of the fixed-cycle task by the main PLC is completed. This is due to variation in process time of the fixed-cycle task. Note that the variation in process time of the fixed-cycle task occurs because the fixed-cycle task is given a lower priority than the reference task.

The computer 40 (see FIG. 7) determines control sequences so that, even with the variation, reception of a result of a process from the auxiliary PLC and execution of a user program (UPG) and a motion control (MC) using the result of the process are completed within one (1) task cycle. An expected amount of the variation in process time may be calculated by the computer 40, or the user may instruct the computer 40 about the expected amount of the variation in advance.

As described above, in Embodiment 1, it is unnecessary to newly provide, as the master device of the first industrial network 10A (see FIG. 5), a PLC having a higher performance (memory capacity and/or calculation capability) than that of a PLC that was already present before the extension. That is, no additional equipment investment is required.

Further, in Embodiment 1, since the first industrial network 10A does not need to be divided into a plurality of networks, it is not necessary to carry out (i) changing of a network which has been laid and (ii) designing for enabling synchronization between controls carried out by a respective plurality of PLC devices that operate as masters in the divided networks.

Note that Embodiment 1 also requires a process of determining in advance which process of the main PLC is to be carried out by the auxiliary PLC on behalf of the main PLC. However, this process per se is carried out by the computer 40, as described above with reference to FIG. 9.

Note that control sequences shown in FIG. 10 represent a case in which a result of a process carried out by the auxiliary PLC on behalf of the main PLC is not used by a user program (UPG) and a motion control (MC) of the main PLC. As such, the result of the process is received by the main PLC from the auxiliary PLC after a task carried out by the main PLC has been completed.

Note that, in a case where the result of the process carried out by the auxiliary PLC on behalf of the main PLC needs to be used by a user program (UPG) and a motion control (MC) of the main PLC, a period 52 (see FIG. 6), in which a user program (UPG) and a motion control (MC) are carried out with use of a result of the process carried out by the auxiliary PLC on behalf of the main PLC, may be provided after the data from the auxiliary PLC is received (after the reception period 51 (see FIG. 6)).

Embodiment 2

Configuration of Network System

Figure 11:
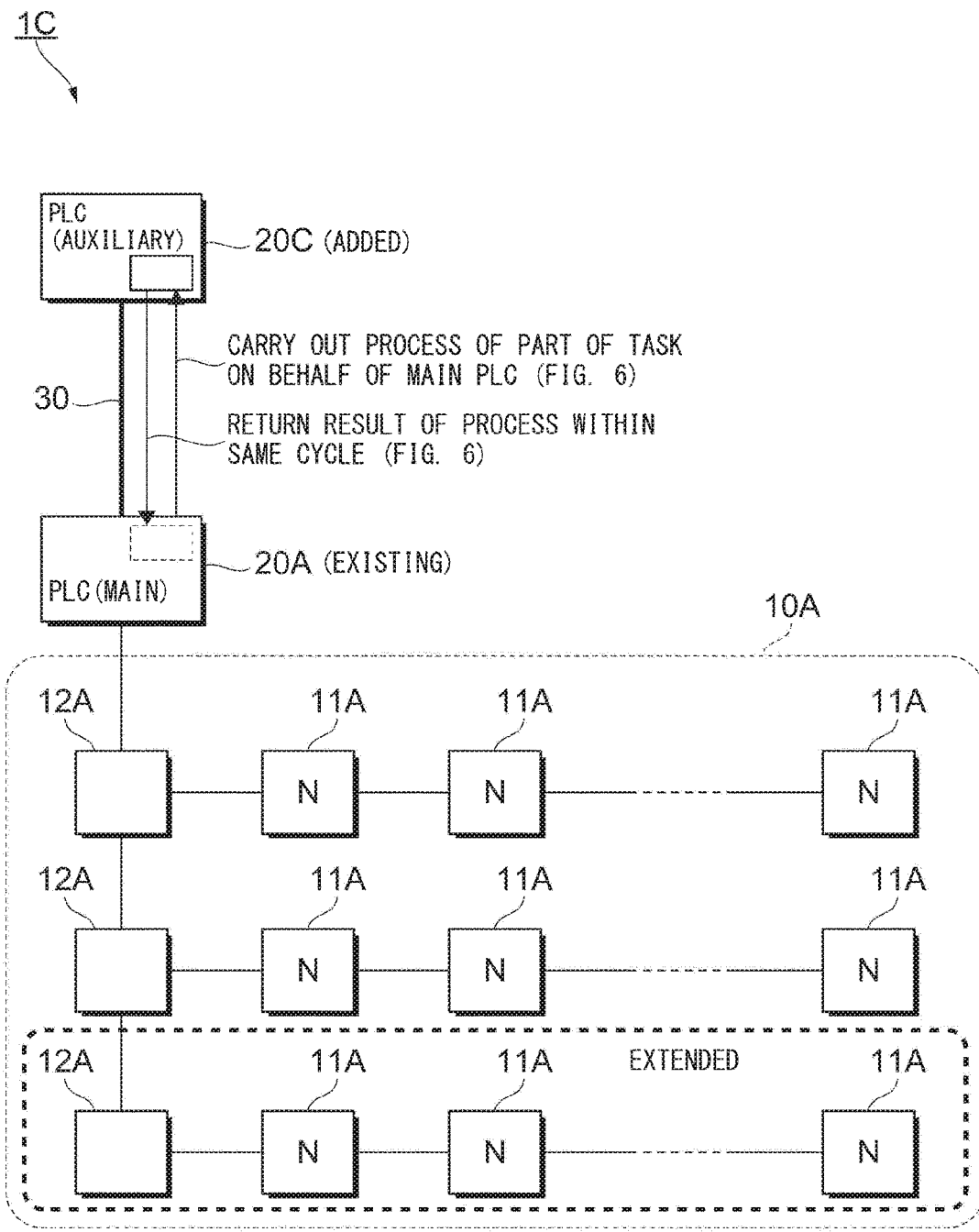
FIG. 11 is a view illustrating another example of a configuration of a network system which has been extended.

FIG. 11 is a view illustrating another example of a configuration of a network system 1C which has been extended (hereinafter referred to as "network system 1C").

In FIG. 11, the same reference signs are given to members each corresponding to a member illustrated in FIG. 5.

Also in FIG. 11, a first industrial network 10A has been extended to have another line. Accordingly, a PLC 20A, which operates as a master device of the first industrial network 10A, is used as a main PLC.

Embodiment 2 is characterized by the fact that no existing PLC is used as an auxiliary PLC. As such, in FIG. 11, no network is connected to a PLC 20C which is used as the auxiliary PLC.

That is, the following description of Embodiment 2 will deal with a case in which the PLC 20C to be used exclusively as the auxiliary PLC is newly added.

Operation Example

Figure 12:
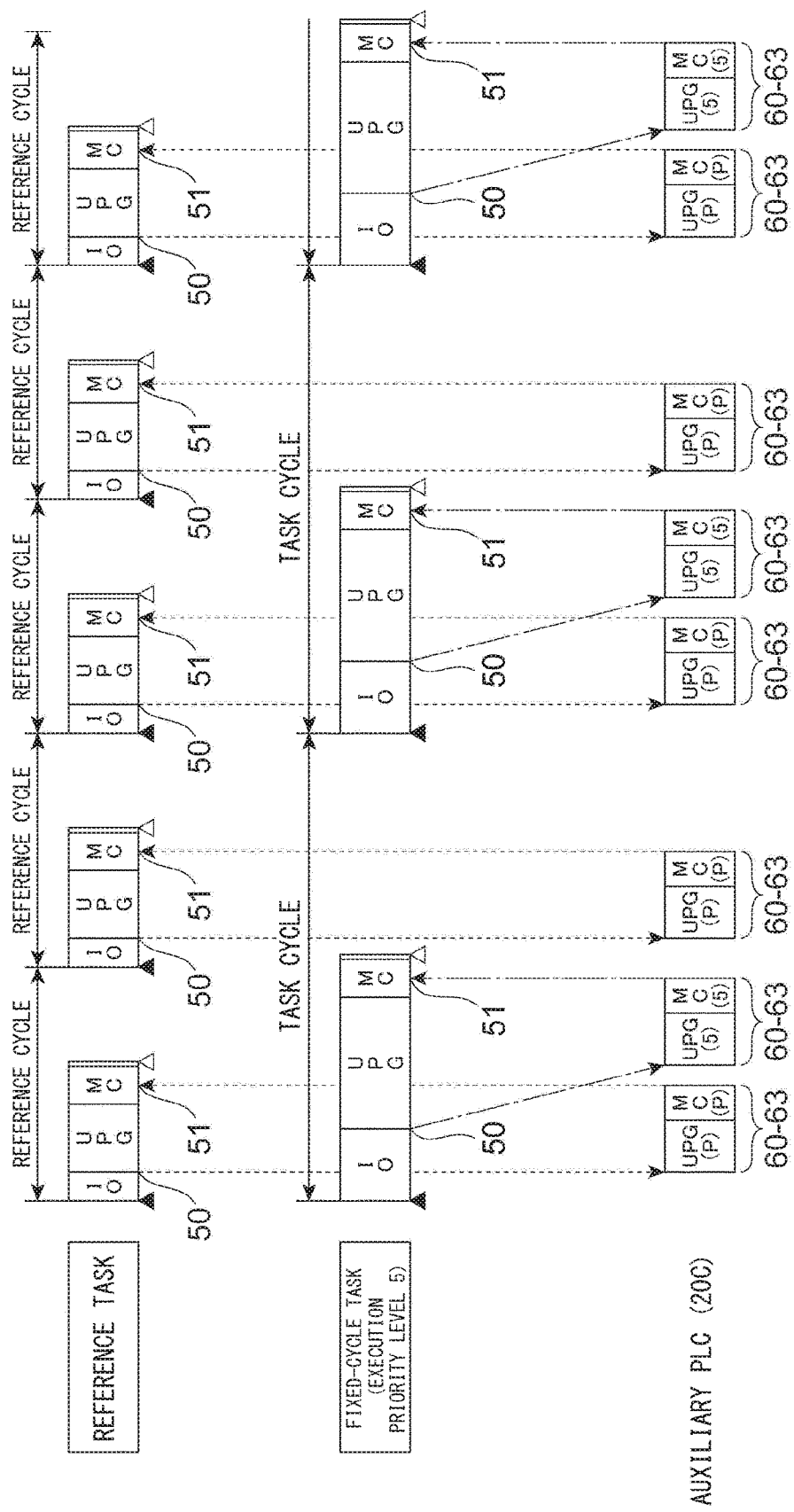
FIG. 12 is a view illustrating an example of a relationship between a control sequence of a main PLC of a network system which has been extended and a control sequence of an auxiliary PLC.

FIG. 12 is a view illustrating an example of a relationship between a control sequence of the main PLC (PLC 20A) of the network system 1C which has been extended (see FIG. 11) and a control sequence of the auxiliary PLC (PLC 20C).

In the case illustrated in FIG. 12, two types of tasks (a reference task and a fixed-cycle task) are carried out by the main PLC, and no task is carried out by the auxiliary PLC.

Also in the case illustrated in FIG. 12, a task cycle corresponding to the fixed-cycle task is twice a reference cycle. Note that FIG. 12 shows only a part of tasks carried out by the main PLC.

In the case illustrated in FIG. 12, both a part of a process of the reference task and a part of a process of the fixed-cycle task (a nonreference task) which are to be carried out by the main PLC are allocated to a single auxiliary PLC.

In Embodiment 2, the auxiliary PLC carries out a process of a part of the reference task in preference to a process of a part of the fixed-cycle task. Note that the auxiliary PC may carry out the process of the part of the reference task and the process of the part of the fixed-cycle task in parallel.

In the case illustrated in FIG. 12, it is only necessary that (i) a notification of a result of the process of the part of the reference task be carried out so as not to cause a problem in execution of the reference task and (ii) a notification of a result of the process of the part of the fixed-cycle task be carried out so as not to cause a problem in execution of the fixed-cycle task.

In this operation example, it is only necessary to provide one (1) dedicated auxiliary PLC, and it is therefore easy to determine additional wiring lines and control sequences.

Figure 13:
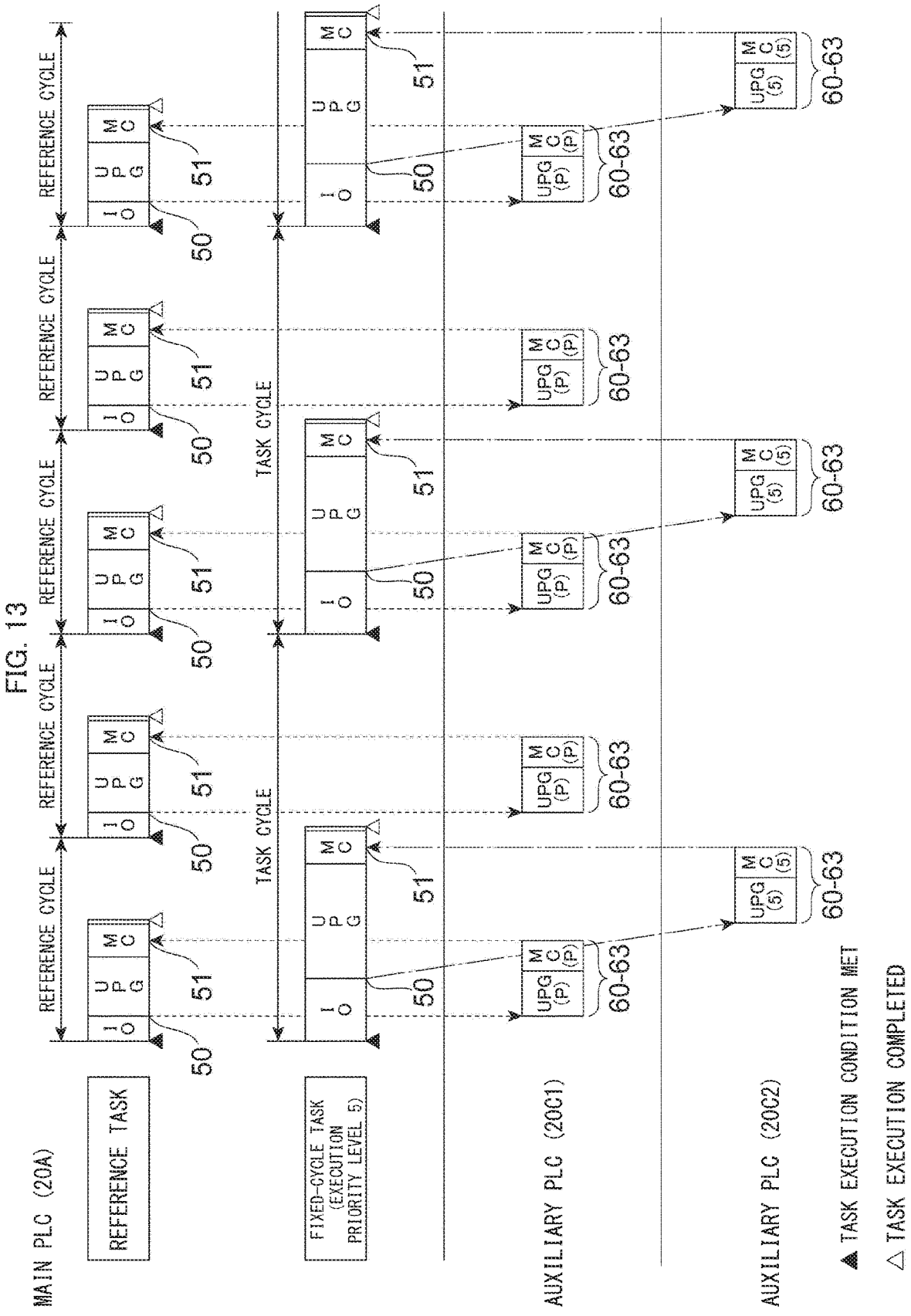
FIG. 13 is a view illustrating an example of a relationship between a control sequence of a main PLC of a network system which has been extended and control sequences of two auxiliary PLCs.

FIG. 13 is a view illustrating an example of a relationship between a control sequence of the main PLC (PLC 20A) of the network system 1C which has been extended (see FIG. 11) and control sequences of two auxiliary PLCs (PLC 20C1 and PLC 20C2).

That is, the control sequences shown in FIG. 13 differ from the above-described operation example in that two auxiliary PLCs are provided.

Also in the case illustrated in FIG. 13, two types of tasks (a reference task and a fixed-cycle task) are carried out by the main PLC, but no tasks are carried out by the PLC 20C1 and the PLC 20C2 which are the auxiliary PLCs.

Also in the case illustrated in FIG. 13, a task cycle corresponding to the fixed-cycle task is twice the reference cycle. FIG. 13 represents only a part of tasks carried out by the main PLC.

In the case illustrated in FIG. 13, a part of a process of the reference task to be carried out by the main PLC is allocated to the PLC 20C1, and a part of a process of the fixed-cycle task (a nonreference task) to be carried out by the main PLC is allocated to the PLC 20C2.

In this case, a performance which each of the PLC 20C1 and the PLC 20C2, which operate as auxiliary PLCs, is required to have is lower than a performance required in the case of using a single auxiliary PLC. This makes it possible to effectively utilize existing facilities.

Other Embodiments

Thus, embodiments of the present invention have been described. However, the technical scope of the present invention is not limited to the scope of the descriptions of the above embodiments. It is also apparent from the appended claims that the above-described embodiments are within the scope of the claims even when various modifications and improvements are made to the embodiments.

In the case of Embodiment 1 described above, a process of a part of a fixed-cycle task is taken over by an existing auxiliary PLC. Meanwhile, as in the case of Embodiment 2, a process of a part of a reference task may be taken over by an existing auxiliary PLC.

In the above description of the embodiments, a process of a part of one (1) task is taken over by one (1) auxiliary PLC. Note, however, that a process of a part of one (1) task may be taken over by a plurality of auxiliary PLCs.

In the above description of the embodiments, parts of processes of two tasks (i.e., a reference task and a fixed-cycle task) differing in task cycle are taken over by respective different auxiliary PLCs. Note, however, that parts of processes of a plurality of tasks identical in task cycle may be allocated to respective different auxiliary PLCs.

Aspects of the present invention can also be expressed as follows:

Aspect 1 of the present invention is a network system, including: a first master device configured to carry out, in every cycle, (i) a process of receiving data from a first slave device, (ii) a process of carrying out, in accordance with pre-allocation, a part of a first process with respect to the data which has been received, (iii) a process of transmitting data corresponding to a remainder of the first process to an outside entity in accordance with the pre-allocation and receiving a result corresponding the remainder of the first process, and (iv) a process of transmitting, to the first slave device, a result corresponding to the first process; at least one second master device configured to transmit, to the first master device before a period allocated to the first process within the cycle ends, the result corresponding to the remainder of the first process with respect to the data received from the first master device; a first network configured to transmit data between the first slave device and the first master device; and a second network configured to transmit data between the first master device and the at least one second master device.

In Aspect 2 of the present invention, the network system in accordance with Aspect 1 may be configured such that the at least one second master device is configured to carry out, with use of a vacant time during which neither a process of receiving data from a second slave device and carrying out a second process nor a process of transmitting data to the second slave device is carried out, (i) reception of data from the first master device, (ii) a process corresponding to the remainder of the first process, and (iii) transmission, to the first master device, of the result corresponding to the remainder of the first process.

In Aspect 3 of the present invention, the network system in accordance with Aspect 1 or 2 may be configured such that the cycle has a length obtained by multiplying a length of a reference cycle by a constant number.

In Aspect 4 of the present invention, the network system in accordance with Aspect 1 or 2 may be configured such that a process carried out by the at least one second master device as the remainder of the first process includes a plurality of processes whose cycles differ in length.

In Aspect 5 of the present invention, the network system in accordance with Aspect 1 or 2 may be configured such that in a case where the at least one second master device is a plurality of second master devices, a plurality of processes whose cycles are identical in length are allocated to respective different second master devices.

In Aspect 6 of the present invention, the network system in accordance with Aspect 1 or 2 may be configured such that in a case where the at least one second master device is a plurality of second master devices, the plurality of second master devices carry out respective processes whose cycles differ in length.

In Aspect 7 of the present invention, the network system in accordance with Aspect 1 or 2 may be configured such that in a case where the at least one second master device is a plurality of second master devices, the plurality of second master devices carry out respective processes corresponding to respective different tasks.

In Aspect 8 of the present invention, the network system in accordance with Aspect 2 may be configured such that the at least one second master device is configured to carry out, within the cycle, the second process and the process corresponding to the remainder of the first process.

In Aspect 9 of the present invention, the network system in accordance with Aspect 1 or 2 may be configured such that the first master device is configured to suspend, until the first master device receives the result corresponding to the remainder of the first process from the at least one second master device, a process which is a part of the first process and in which the result is used.

In Aspect 10 of the present invention, the network system in accordance with Aspect 1 may be configured such that the network system further includes a management device configured to set an operation schedule of the first master device and the at least one second master device such that the first process is carried out within a corresponding cycle.

In Aspect 11 of the present invention, the network system in accordance with Aspect 2 may be configured such that the network system further includes a management device configured to set an operation schedule of the first master device and the at least one second master device such that the first process is carried out within a cycle corresponding to the first process and the second process is carried out within a cycle corresponding to the second process.

According to Aspect 1 of the present invention, even in a case where a load of a process is beyond the performance of an existing master device, neither division of a network nor new designing is necessary in order to distribute the load.

According to Aspect 2 of the present invention, a processing ability of an existing second master device can be effectively utilized.

According to Aspect 3 of the present invention, even in a case where the first process to be carried out within a period having a length obtained by multiplying the reference cycle by a constant number is increased, it is possible to finish the first process within the period corresponding to the first process.

According to Aspect 4 of the present invention, a single second master device can take over a plurality of processes corresponding to a plurality of cycles.

According to Aspect 5 of the present invention, a plurality of processes corresponding to one (1) cycle can be distributed to a plurality of second master devices.

According to Aspect 6 of the present invention, a plurality of processes corresponding to a plurality of cycles can be distributed to a plurality of second master devices.

According to Aspect 7 of the present invention, a plurality of second master devices can take over different tasks.

According to Aspect 8 of the present invention, a part of the first process to be carried out by the first master device can be taken over by a second master device, while an existing process schedule of the second master device is left unchanged.

According to Aspect 9 of the present invention, a process operation can be carried out within one (1) cycle even in a case where a part of a process is taken over by a second master device.

According to Aspect 10 of the present invention, neither division of a network nor new designing is necessary.

According to Aspect 11 of the present invention, neither division of a network nor new designing is necessary.

REFERENCE SIGNS LIST

1A: network system which has not been extended
1B, 1C: network system which has been extended
10A: first industrial network
10B: second industrial network
11A, 11B: device
11C: communication cable
12A: branch slave
20A, 20B: PLC
30: high-speed/synchronization network
40: computer

The invention claimed is:

1. A network system, comprising:
a first master device configured to carry out, in every cycle, (i) a process of receiving data from a first slave device, (ii) a process of carrying out, in accordance with pre-allocation, a part of a first process with respect to the data which has been received, (iii) a process of transmitting data corresponding to a remainder of the first process to an outside entity in accordance with the pre-allocation and receiving a result corresponding the remainder of the first process, and (iv) a process of transmitting, to the first slave device, a result corresponding to the first process;
at least one second master device configured to transmit, to the first master device before a period allocated to the first process within the cycle ends, the result corresponding to the remainder of the first process with respect to the data received from the first master device;
a first network configured to transmit data between the first slave device and the first master device; and
a second network configured to transmit data between the first master device and the at least one second master device.

2. The network system as set forth in claim 1, wherein the at least one second master device is configured to carry out, with use of a vacant time during which neither a process of receiving data from a second slave device and carrying out a second process nor a process of transmitting data to the second slave device is carried out, (i) reception of data from the first master device, (ii) a process corresponding to the remainder of the first process, and (iii) transmission, to the first master device, of the result corresponding to the remainder of the first process.

3. The network system as set forth in claim 2, wherein the at least one second master device is configured to carry out, within the cycle, the second process and the process corresponding to the remainder of the first process.

4. The network system as set forth in claim 2, further comprising a management device configured to set an operation schedule of the first master device and the at least one second master device such that the first process is carried out within a cycle corresponding to the first process and the second process is carried out within a cycle corresponding to the second process.

5. The network system as set forth in claim 1, wherein the cycle has a length obtained by multiplying a length of a reference cycle by a constant number.

6. The network system as set forth in claim 1, wherein a process carried out by the at least one second master device as the remainder of the first process includes a plurality of processes whose cycles differ in length.

7. The network system as set forth in claim 1, wherein in a case where the at least one second master device is a plurality of second master devices, a plurality of processes whose cycles are identical in length are allocated to respective different second master devices.

8. The network system as set forth in claim 1, wherein in a case where the at least one second master device is a plurality of second master devices, the plurality of second master devices carry out respective processes whose cycles differ in length.

9. The network system as set forth in claim 1, wherein in a case where the at least one second master device is a plurality of second master devices, the plurality of second master devices carry out respective processes corresponding to respective different tasks.

10. The network system as set forth in claim 1, wherein the first master device is configured to suspend, until the first master device receives the result corresponding to the remainder of the first process from the at least one second master device, a process which is a part of the first process and in which the result is used.

11. The network system as set forth in claim 1, further comprising a management device configured to set an operation schedule of the first master device and the at least one second master device such that the first process is carried out within a corresponding cycle.

* * * * *